(12) United States Patent
Lind et al.

(10) Patent No.: US 12,688,712 B2
(45) Date of Patent: Jul. 21, 2026

(54) SEAT BELT DETECTION

(71) Applicant: Smart Eye AB, Gothenburg (SE)

(72) Inventors: Henrik Lind, Gothenburg (SE);
Torsten Wilhelm, Gothenburg (SE);
Ara Jafarzadeh, Gothenburg (SE); Joel Severin, Gothenburg (SE)

(73) Assignee: Smart Eye AB, Gothenburg (SE)

( * ) Notice: Subject to any disclaimer, the term of this patent is extended or adjusted under 35 U.S.C. 154(b) by 281 days.

(21) Appl. No.: 18/380,296

(22) Filed: Oct. 16, 2023

(65) Prior Publication Data

US 2024/0127606 A1 Apr. 18, 2024

(30) Foreign Application Priority Data

Oct. 18, 2022 (EP) ..................................... 22202159

(51) Int. Cl.
| | |
|---|---|
| *G06V 20/59* | (2022.01) |
| *G06T 7/13* | (2017.01) |
| *G06T 7/73* | (2017.01) |
| *G06V 40/10* | (2022.01) |

(52) U.S. Cl.
CPC ................ *G06V 20/59* (2022.01); *G06T 7/13* (2017.01); *G06T 7/73* (2017.01); *G06V 40/10* (2022.01); *G06T 2207/30196* (2013.01); *G06T 2207/30268* (2013.01)

(58) Field of Classification Search
CPC .................. G06V 20/593; G06V 40/10; G06T 2207/30268; G06T 2207/30196; G06T 7/73; G06T 7/13
See application file for complete search history.

(56) References Cited

U.S. PATENT DOCUMENTS

| | | | | |
|---|---|---|---|---|
| 2016/0046261 A1* | 2/2016 | Gulash | ................... | G06T 17/20 |
| | | | | 701/45 |
| 2017/0021799 A1* | 1/2017 | Hennes | ................... | B60R 22/48 |
| 2021/0114541 A1* | 4/2021 | Hosokawa | ............ | B60W 40/08 |
| 2021/0394710 A1* | 12/2021 | Hu | ........................ | B60W 50/14 |
| 2022/0305986 A1* | 9/2022 | Hirohashi | ............ | H05B 47/125 |

(Continued)

FOREIGN PATENT DOCUMENTS

| | | | | |
|---|---|---|---|---|
| CN | 105946786 B | * 12/2018 | ............. | B60R 22/48 |
| CN | 110569732 | 12/2019 | | |

OTHER PUBLICATIONS

Hartleitner et al "Automated quantification of occupant posture and shoulder belt fit using safety specific key points." IEEE Open Journal of Intelligent Transportation Systems 3 (Year: 2022).*

(Continued)

*Primary Examiner* — Shaghayegh Azima
(74) *Attorney, Agent, or Firm* — PANITCH SCHWARZE BELISARIO & NADEL LLP

(57) ABSTRACT

A system and method for determining if an occupant of a vehicle has correctly applied a seat belt by acquiring an image of the occupant, the image including at least a shoulder portion of the occupant, identifying left and right shoulders and a longitudinal extension of a seat belt in the image, determining an intersection between the longitudinal extension and a line connecting the left and right shoulders, and, based on a relative position of the intersection and the shoulders, deducing whether the seat belt is correctly applied.

6 Claims, 3 Drawing Sheets

(56) References Cited

U.S. PATENT DOCUMENTS

2023/0196796 A1\* 6/2023 Naik ................. B60R 21/01538
                                                348/77
2024/0029452 A1\* 1/2024 Cho ....................... G06V 20/59

OTHER PUBLICATIONS

Extended European Search Report, dated Apr. 11, 2023, issued in
corresponding European Application No. 22202159.4-1207, 5 pgs.
Hartleitner et al, "Automated Quantification of Occupant Posture
and Shoulder Belt Fit Using Safety Specific Key Points", IEEE
Open Journal of Intelligent Transportation Systems, IEEE, vol. 3,
Jan. 6, 2022, pp. 89-103, XP011899521, DOI: 10.1109/OJITS.2022.
3140612.

\* cited by examiner

SEAT BELT DETECTION

TECHNICAL FIELD OF THE INVENTION

The present invention relates generally to the field of cabin monitoring using an image sensor (camera). Specifically, the invention relates to determining if an occupant of the vehicle is correctly wearing a seat belt (safety belt).

BACKGROUND OF THE INVENTION

Various driver and cabin monitoring systems (DMS, CMS) using image sensors are known in the art. Most driver monitoring systems are focused on the face and eyes of the driver, and may determine where the driver is looking, if the driver is tired or unfocussed, if the driver is under influence of drugs, etc. Cabin monitoring systems, on the other hand, are more generally related to various types of information about the inside of the cabin and the people therein.

Cabin monitoring systems typically include an image sensor (camera) configured to acquire an image of a larger part, e.g., the torso, of the occupants of the vehicle, e.g., the driver. It has been suggested to use such image data to provide information about the seat belt, e.g., if it is properly applied. Document CN 110569732 provides one example of such a system, involving determination of an angle of the belt. The angle detection can indicate whether the seat belt is correctly fastened. Optionally, the image data and detected angle may be provided to a trained neural network, to provide an improved assessment of the position of the seat belt.

The use of image data to determine whether a seat belt is correctly fastened provides a valuable complement to more rudimentary sensors such as a switch in the latch of the belt. However, existing systems, such as CN 110569732, are not sufficiently accurate or require extensive amounts of processing power.

SUMMARY OF THE INVENTION

It is an object of the present invention to provide an improved approach to image-based determination of a position of a vehicle seat belt.

According to a first aspect of the invention, this object is achieved by a computer implemented method for determining if an occupant of a vehicle has correctly applied a seat belt, the method comprising acquiring an image of the occupant, the image including at least a shoulder portion of the occupant, identifying, in the image, left and right shoulders, identifying, in the image, a longitudinal extension of a seat belt, determining an intersection between the longitudinal extension and a line connecting the left and right shoulders, and based on a relative position of the intersection and the shoulders, deducing whether the seat belt is correctly applied.

According to a second aspect of the invention, this object is achieved by a system for determining if an occupant of a vehicle has correctly applied a seat belt, the system comprising a camera for acquiring an image of the occupant, the image including at least a shoulder portion of the occupant, a body analysis unit for identifying, in the image, left and right shoulders, a seat belt identifier for identifying, in the image, a longitudinal extension of a seat belt, and an assessment unit for determining an intersection between the longitudinal extension and a line connecting the left and right shoulders, and, based on a relative position of the intersection and the shoulders, deducing whether the seat belt is correctly applied.

The invention is based on the fact that shoulders of an occupant and longitudinal extension of a seat belt can be reliably detected in an image using simple image processing. An intersection between these lines will provide a useful indication of whether the seat belt is in a correct position, and thus whether it has been correctly applied.

BRIEF DESCRIPTION OF THE DRAWINGS

The present invention will be described in more detail with reference to the appended drawings, showing currently preferred embodiments of the invention.

DETAILED DESCRIPTION OF CURRENTLY PREFERRED EMBODIMENTS

In the following, embodiments of the invention are described in the context of a vehicle cabin monitoring system. It is noted that other implementations of the present invention are also possible.

Figure 1:
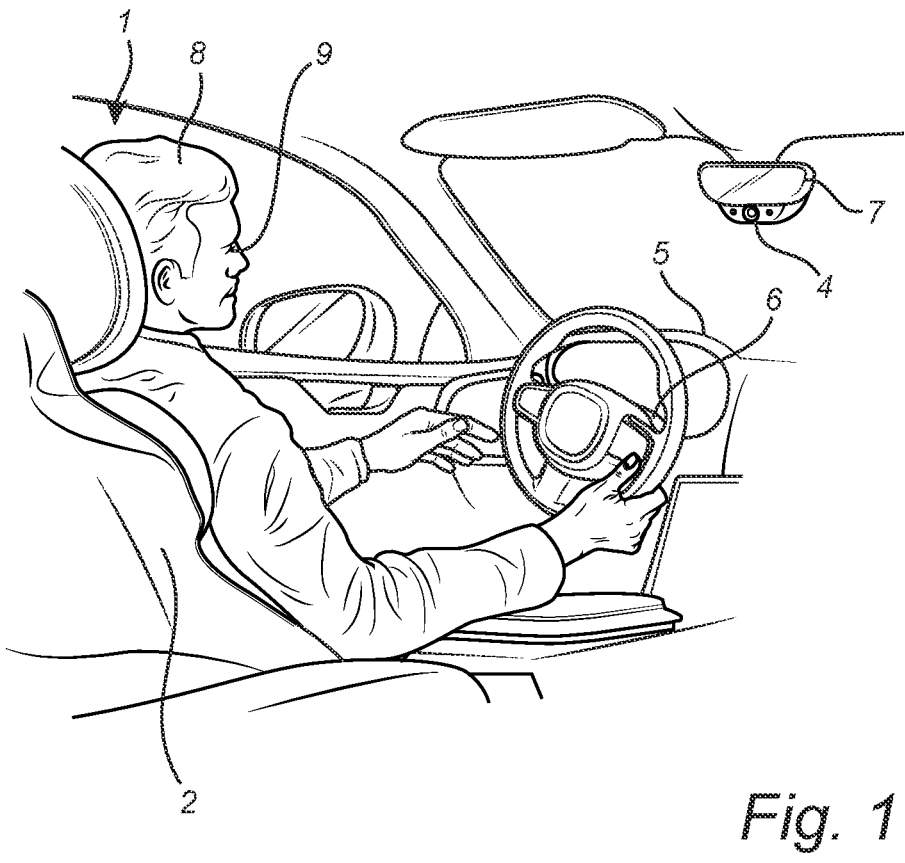
FIG. 1 schematically shows a camera mounted on the rearview mirror of a vehicle.

FIG. 1 shows a driver 1 sitting in a driver's seat 2 of vehicle 3. A camera 4 is mounted in front of the driver 1, here on the rearview mirror 7. Alternatively, the eye-tracking system 4 may be mounted on the dashboard 5, on the steering wheel column 6, or fixed to the ceiling. Regardless of how it is mounted, the camera 4 should have a clear view of the upper body of vehicle occupants intended to monitor. Typically, a camera in the front of the vehicle, e.g., mounted on the rear-view mirror, will be able to monitor at least the driver and the front passenger, The camera 4 is typically arranged at a distance d1 from the driver 1 in the range from 40 cm to 120 cm, and most typically at "arm length", i.e., around 60-70 cm.

Figure 2:
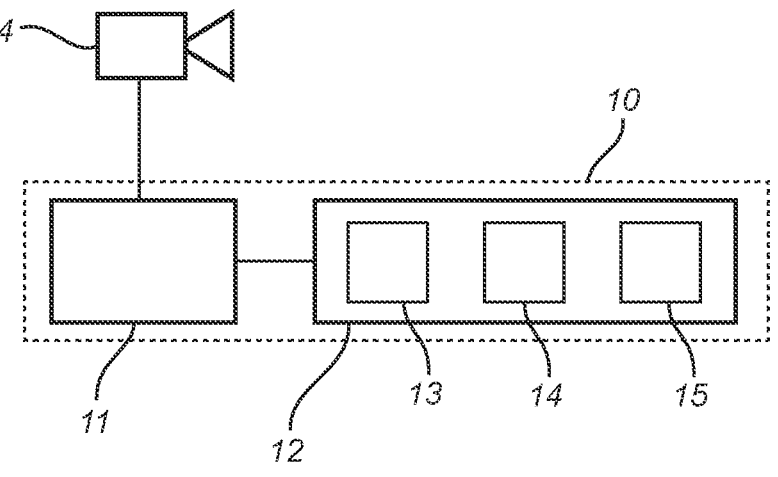
FIG. 2 shows a schematic block diagram of a system according to an embodiment of the present invention.
Figure 3:
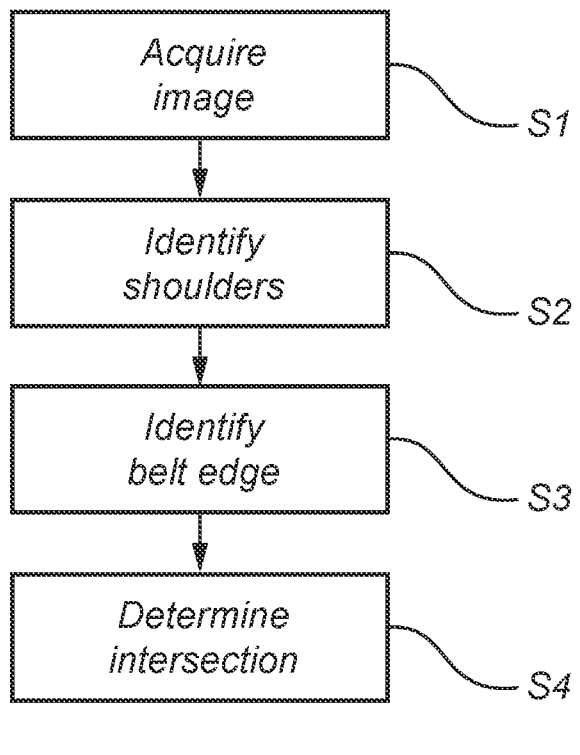
FIG. 3 shows a flow chart of a method according to an embodiment of the present invention.

The camera 4 is connected to a processing system 10 (not shown in FIG. 1). With reference to FIG. 2, the system 10 in the illustrated example includes an image acquisition unit (e.g., a frame grabber) 11 connected to the camera 4, and an image processing device 12. The image processing device includes a body analysis unit 13, a seat belt identifier 14 and an assessment unit 15.

Operation of the system 10 will be explained with reference to FIGS. 3 and 4a-c. First, an image 20 showing at least the head and upper torso of a vehicle occupant 22, here the driver 1, is acquired in step S1. The image is sent to the image processing device 12, and in step S2 the body analysis unit 13 identifies the location of the shoulders 21a, 21b of an occupant 22 in the image. This identification can be done using standard image analysis methods, including edge detection algorithms such as Canny edge detection, and statistical data relating to human body shape. It may be advantageous to use a so-called human pose estimation algorithm, which is configured to identify locations of body joints (knees, elbows, shoulders, etc). Further details may be found e.g., in the article "The Progress of Human Pose Estimation: A Survey and Taxonomy", by Munea et al., IEEE, Jul. 20, 2020. A human pose estimation algorithm may efficiently and robustly determine the locations of the shoulders 21*a*, 21*b*, specifically the shoulder joints. Further, the unit 13 defines a line A connecting the two shoulders 21*a*, 21*b*.

In step S3, the seat belt identifier identifies a longitudinal extension B of a seat belt 24 in the image. This identification can be made using conventional image analysis methods and may involve detection of an edge 23 of the seat belt 24, e.g., using a Canny edge detector algorithm. While it is possible to detect the edges of the seat belt with conventional approaches such as Canny edge detection, such approaches typically do not perform well when there is not sufficient contrast between the seatbelt and the driver's clothes, i.e., when the color/darkness gradient is not large enough. For this reason, a segmentation network may be applied to generate a polygon around the seat belt, thereby increasing robustness.

Figure 4A:
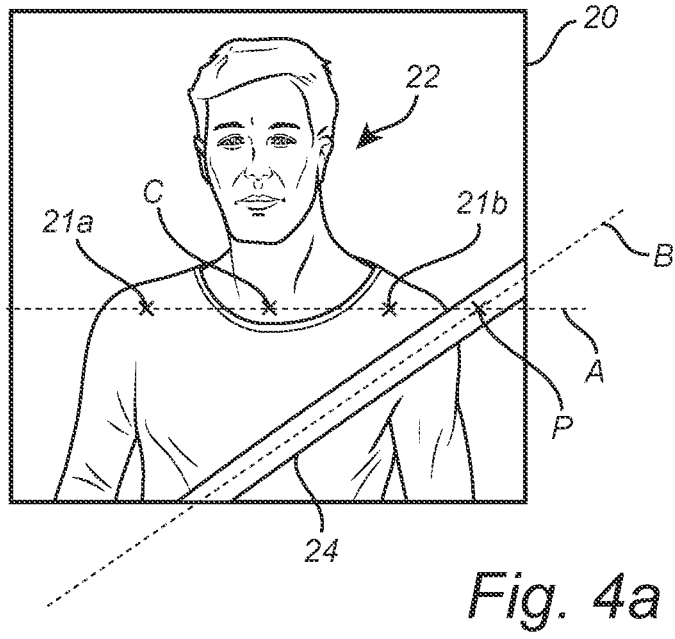
FIG. 4a-c shows examples of images of a vehicle occupant acquired by the camera in FIG. 1.
Figure 4B:
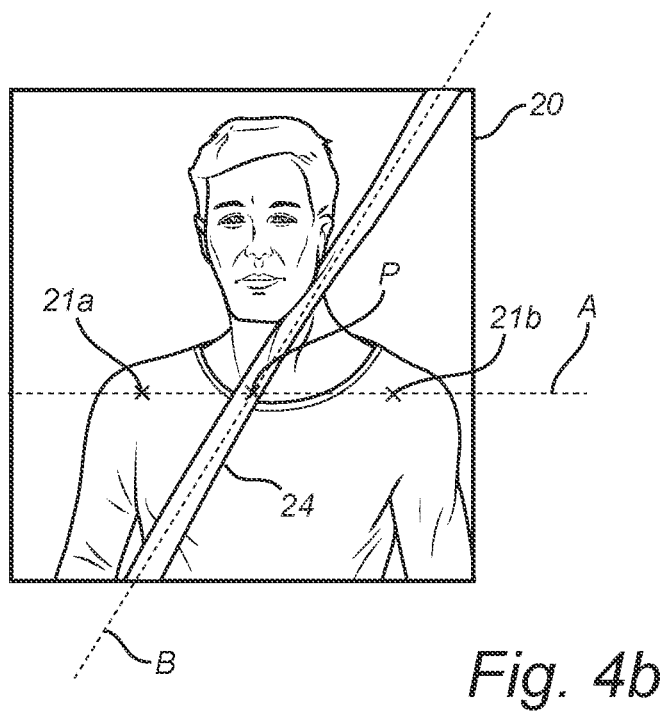
Figure 4C:
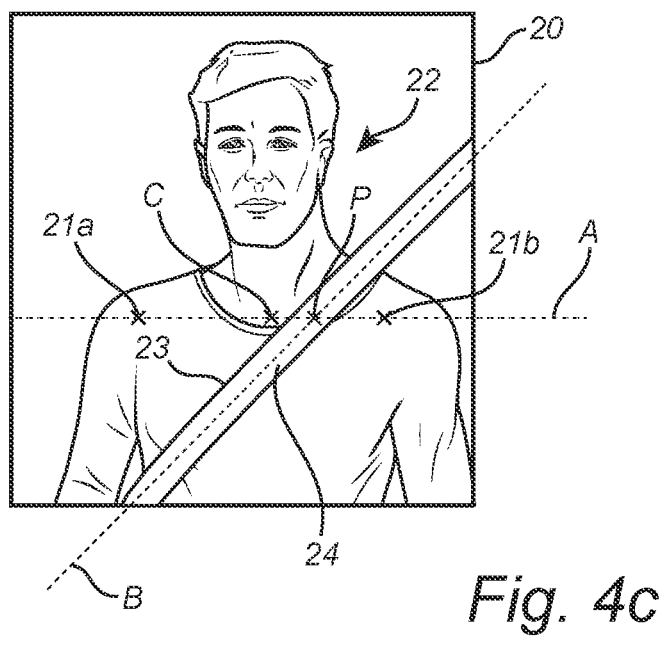

In step S4, the assessment unit 15 determines an intersection P of lines A and B. By comparing this intersection P with the positions of the shoulders 21*a*, 21*b*, the assessment unit 15 can deduce if the seat belt 24 has been properly applied by the occupant 22. For example, as shown in FIG. 4*a*, an intersection located too far outside the shoulders 21*a*, 21*b* typically indicates that the seat belt 24 is in an incorrect position. Similarly, as shown in FIG. 4*b*, if the intersection P is close to a center point between the shoulders (i.e., under the chin of the user) typically also indicates that the seat belt is in an incorrect position. Finally, as indicated in FIG. 4*c*, if the intersection P is reasonably close to one of the shoulders, the assessment unit 15 may determine that the seat belt 24 is in a correct position and has been applied correctly.

The person skilled in the art realizes that the present invention by no means is limited to the preferred embodiments described above. On the contrary, many modifications and variations are possible within the scope of the appended claims. For example, the invention may be relevant also for other implementations than driver monitoring.

What is claimed is:

1. A computer implemented method for determining if an occupant of a vehicle has correctly applied a seat belt, the method comprising:
    acquiring an image of the occupant, said image including at least a shoulder portion of the occupant;
    identifying, in said image, positions of left and right shoulders;
    identifying, in said image, a longitudinal extension of a seat belt;

determining an intersection between said longitudinal extension and a line connecting said left and right shoulders; and
    based on a position of said intersection relative to the positions of the left and right shoulders, deducing whether said seat belt is correctly applied by comparing the intersection with the positions of the left and right shoulders and determining that the intersection is located between the left and right shoulders, wherein the step of deducing further includes determining that the intersection is located closer to one shoulder than a center point between said left and right shoulders.

2. The method according to claim 1, wherein the step of identifying left and right shoulders involves a human pose estimation algorithm, which is configured to identify locations of body joints.

3. The method according to claim 1, wherein the step of identifying a longitudinal extension of a seat belt includes edge detection in said image.

4. A system for determining if an occupant of a vehicle has correctly applied a seat belt, the system comprising:
    a camera for acquiring an image of the occupant, said image including at least a shoulder portion of the occupant;
    a body analysis unit for identifying, in said image, positions of left and right shoulders;
    a seat belt identifier configured to identify, in said image, a longitudinal extension of a seat belt; and
    an assessment unit configured to:
        determine an intersection between said longitudinal extension and a line connecting said left and right shoulders; and
        based on a position of said intersection relative to the positions of said left and right shoulders, deduce whether said seat belt is correctly applied by comparing the intersection with the positions of the left and right shoulders and determining that the intersection is located between the left and right shoulders, wherein the assessment unit is further configured to determine that the intersection is located closer to one shoulder than a center point between said left and right shoulders.

5. The system according to claim 4, wherein the assessment unit is further configured to apply a human pose estimation algorithm adapted to identify locations of body joints in order to identify left and right shoulders.

6. The system according to claim 4, wherein the seat belt identifier is configured to identify said longitudinal extension using edge detection in said image.

\* \* \* \* \*